Jan. 7, 1936.   C. B. UPTON   2,027,131
COOKER
Filed July 28, 1931   3 Sheets-Sheet 1
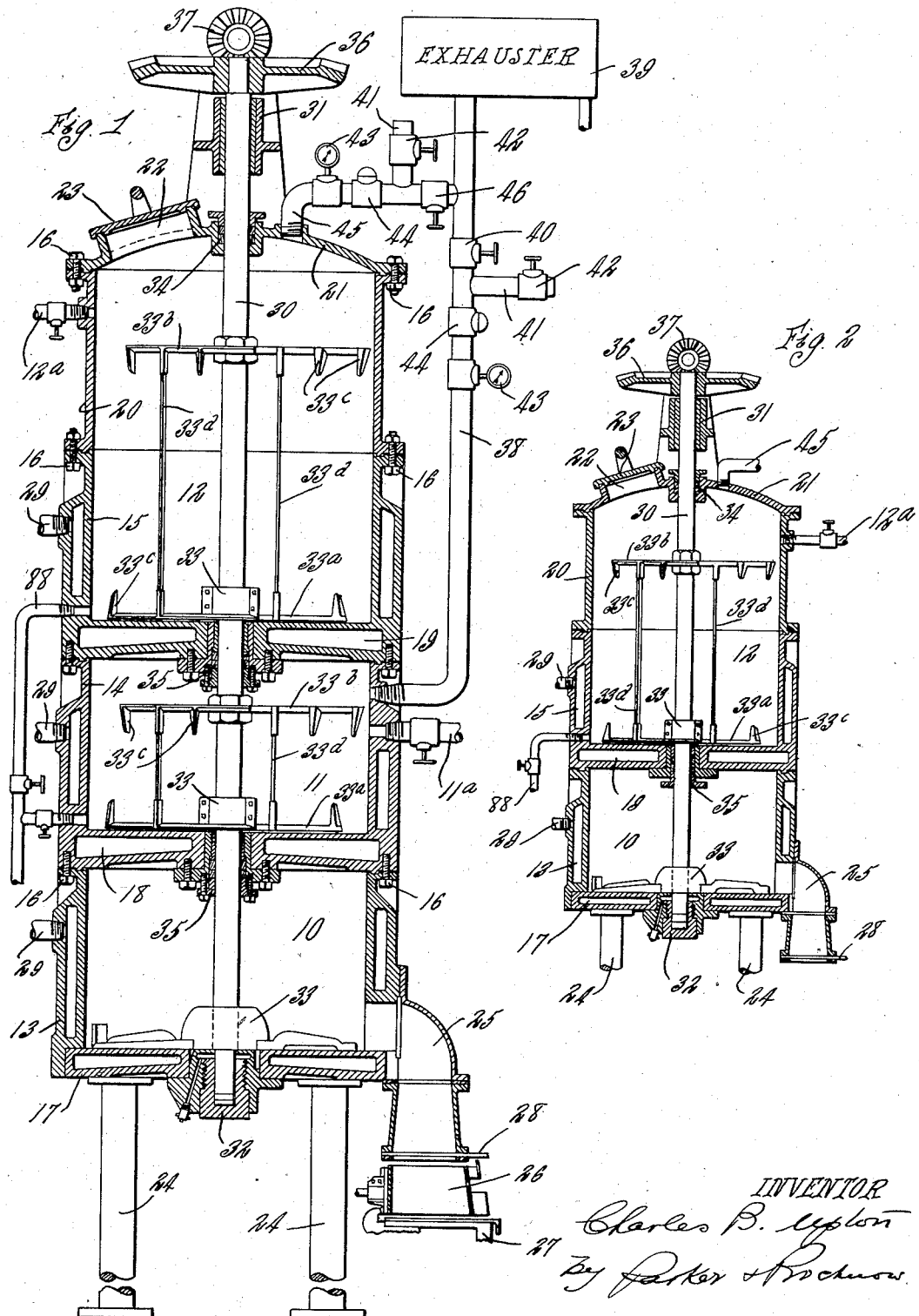

Jan. 7, 1936.  C. B. UPTON  2,027,131
COOKER
Filed July 28, 1931   3 Sheets-Sheet 2

INVENTOR
Charles B. Upton
By Parker & Brockwow.
ATTORNEYS.

Jan. 7, 1936.  C. B. UPTON  2,027,131
COOKER
Filed July 28, 1931   3 Sheets-Sheet 3

INVENTOR
Charles B. Upton
by Parker & Brockman
ATTORNEYS

Patented Jan. 7, 1936

2,027,131

UNITED STATES PATENT OFFICE 2,027,131

COOKER

Charles B. Upton, Piqua, Ohio

Application July 28, 1931, Serial No. 553,574

5 Claims. (Cl. 87—13)

This invention relates to cookers of the type which may be used for cooking lard, fats, meat scraps, packing house offals, garbage, fish, etc., or vegetable oil bearing seeds and nuts. In the cooking of meat scraps, for example, it is desirable to cook the scraps for a certain length of time under a pressure above atmosphere to soften or disintegrate the bones and other similar solids, to facilitate the subsequent pressing and grinding of the same, and it is also desirable to cook the same subsequently under a vacuum in order to reduce the moisture content while continuing the cooking. In both the animal oil and vegetable oil industries, cooking under pressure above atmosphere is desirable to disintegrate and break down the oil cells in the material being cooked, and subsequent cooking under vacuum is also desirable to avoid the necessity of maintaining a high temperature for too long a period of time, because the prolonged cooking at high temperature has a tendency to darken the oil and the cracklings or cake from the material pressed. It is also desirable that the cooked material be kept in a uniform condition as it comes from the cooker until pressed, and made available for use in the press in fractional batches.

An object of this invention is to provide an improved cooker of this type and method of cooking which will produce an improved product, and which will be relatively simple, practical and inexpensive.

Another object of the invention is to provide an improved method of cooking, with which the products to be cooked may be subjected to different cooking treatments in any desired sequence, and dispensed in any desired fractional quantities in uniform condition to a press or other treating agency.

Another object of the invention is to provide an improved means and method of cooking and handling various products, with which the conditions of treatment may be changed from time to time and the different steps of treatment altered in sequence, with which the cost of handling the products during the successive treatments will be a minimum, and which may be more or less automatic in action.

Various other objects and advantages will be apparent from the following description of an embodiment of the invention, and the novel features will be particularly pointed out hereinafter in connection with the appended claims.

In the accompanying drawings:

Fig. 1 is a sectional elevation of a cooker constructed in accordance with this invention;

Fig. 2 is a similar sectional elevation when only one cooking chamber is utilized;

Figure 3:
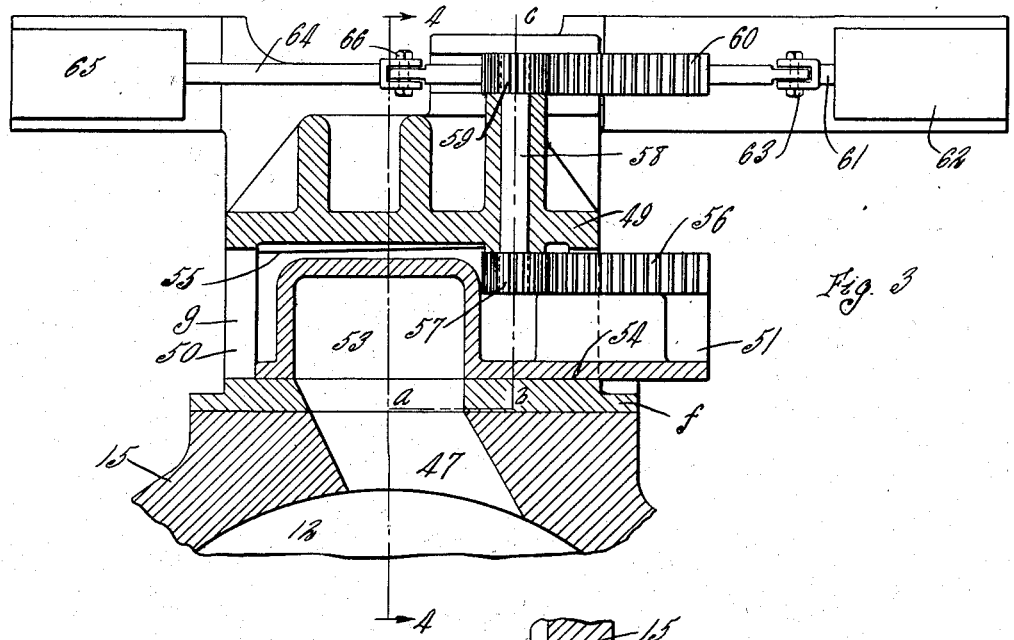
Fig. 3 is a sectional plan through the part of the cooker shown in Fig. 1, to illustrate the gate and its operating mechanism.

Referring first to Figs. 1, 3, 4 and 5, the cooker includes a plurality of compartments or chambers 10, 11, and 12 which are arranged in superposed relation to one another. The cooker is provided with a plurality of steam jacketed sections 13, 14, and 15 which are secured end to end and suitably connected, such as by screws 16, it being understood that if desired, suitable packing gaskets may be interposed between abutting faces of the sections to insure tight connections. The abutting faces of adjacent sections are of material width and substantially horizontal or transverse to the vertical axis of the cooker. One face of each pair of abutting faces has a peripherally continuous rib which interfits with a peripherally continuous groove in the other abutting face of that pair. The lowermost section 13 has a steam jacketed bottom wall 17, and the section 14 has a steam jacketed bottom wall 18 which forms the top of the lower chamber 10. The section 15 has a steam jacketed bottom 19 which serves as the top of the chamber 11.

Section 20 which may be either steam jacketed or not as desired, may be secured to the top of the upper section 15 so as to enlarge the uppermost chamber 12 in which the first step of cooking takes place, because there is considerable shrinkage in many of the products treated during the first step of the cooking. A top member 21 is secured to the upper end of the section 20 so as to complete the uppermost chamber 12 and this top member is provided with a charging hatch 22, having a hatch cover 23 which tightly closes the charging opening during the cooking operation in the first or uppermost chamber 12. The bottom 17 of the lowermost section 13 is suitably supported, such as upon columns 24.

A discharge conduit 25 extends from the lowermost section 13 at a point abutting the bottom 17 thereof, so as to discharge the contents of the lowermost chamber into the usual measuring box 26 of a press or other treating device 27. Since the lowermost chamber 10 is elevated by reason of its support upon the columns 24, the contents of the lowermost chamber will be discharged by gravity through the conduit 25 into the measuring box 26 and a suitable slide valve 28 at the mouth or discharge end of the conduit 25 serves to control the movement of the cooked products into the measuring box 26. The measuring box 26 holds only a fractional part of the maximum content of the chamber 10, and if the quantity of products forming the charge placed in the uppermost chamber 12 is considered as a batch, this batch will be passed successively by gravity from chamber to chamber until it reaches the lowermost chamber 10 and then is discharged by fractional batches into the measuring box 26.

While any desired number of cooking chambers may be employed, I have, for the purpose of simplicity, illustrated only two cooking chambers 11 and 12 and one holding chamber 10 in Fig. 1, but it will be understood that the number of cooking chambers may be increased by adding additional sections 14 or 15. In Fig. 2, as illustrated, there is only one cooking chamber 12 and a holding chamber 10, the intermediate cooking chamber 11 having been omitted. Otherwise, the construction in Fig. 2 is the same as in Fig. 1.

The jacketed sections 13, 14, and 15 and the jacketed bottoms 17, 18, and 19 have passages therein through which live steam is circulated in order to provide heated sides, tops and bottoms to the chambers 10 and 11, and heated side and bottom to the top chamber 12. Steam to such chambers may be supplied by pipes 29, in Figs. 1 and 2, leading to the sections 13, 14 and 15 and it will be understood that the bottom section 17 will have a similar steam supply connection, (not shown). The steam chambers of the bottoms 18 and 19 will be in communication with the chamber in the sides of the sections 14 and 15, and a suitable drainage pipe (not shown) may be provided for each jacketed section or bottom to remove the condensed steam.

An agitator shaft 30 is rotatably mounted in a suitable bearing device 31 provided on the top 21 of the chamber 12, and at its other end is rotatably mounted in a bearing 32 provided in the bottom section 17. The shaft 30 depends successively through the superposed chambers 10, 11, and 12, and in each chamber the shaft carries an agitator 33 which has a portion that operates just above the bottom of the chamber, so that when the agitator shaft is rotated, the agitator 33 will stir the contents of each chamber and keep them thoroughly mixed.

The agitator 33 preferably includes arms 33a and 33b disposed at spaced intervals along and rotating with the shaft 30, one arm 33a being close to the bottom of the chamber and the other arm 33b near the top. These arms are provided with agitating fingers 33c which preferably extend toward the other arm in that chamber, that is, approximately parallel to the axis of rotation of the shaft. The fingers 33c are located at different distances from the shaft, so as to travel in different circles. The arms are also connected by one or more agitator blades 33d which also cut or travel in different circles about the shaft. The blades and fingers thoroughly agitate and break down the products in the chamber, so that the entire mass of the products or material being cooked is exposed constantly to the cooking temperatures and the internal pressure, whereby the material is rapidly cooked and its moisture removed.

A packing gland 34 is provided where the shaft 30 passes through the top 21, and similar packing glands 35 are provided where the shaft 30 passes through the bottom sections 18 and 19. The shaft 30, at its upper end, carries a bevel gear 36 by which it may be rotated, and this gear meshes with a driving pinion 37 which is continuously rotated from any suitable source of power.

A pipe 38 is connected to the interior of the chamber 11, such as through the side wall of the section 14, and leads to an exhauster or other device 39 by which a partial vacuum may be created in the chamber 11 and moisture and gases removed therefrom. A valve 40 in the pipe 38 serves to open or close the connection from the chamber 11 to the exhauster. The exhauster may be an ejector and barometric condenser, or a vacuum condensing pump and it discharges into a hot well with sewer connection. Between the valve 40 and the chamber 11, the pipe 38 is provided with a branch pipe 41 having a controlling valve 42 by which the chamber 11 may be vented after the valve 40 has been shut off. The pipe 38 may also be provided with a gauge 43 which indicates pressures in the chamber 11 both above and below atmosphere, and also a safety pressure valve 44 which vents chamber 11 to atmosphere automatically whenever the pressure in the cooking chamber 11 exceeds a safe or desired maximum.

A similar pipe 45 leads from the top 21 where it opens into the chamber 12, and this pipe 45 is also provided with a pressure gage 43, a safety pressure relief valve 44, and a branch bent pipe 41 controlled by a valve 42. The pipe 45 is also connected to the exhauster 39 under the control of a valve 46 similar to the valve 40. Either or both of the chambers 11 or 12 may thus be connected to the exhauster by first closing the valves 42 and opening the valves 40 or 46, in which case a partial vacuum will be created in each chamber 11 and 12. If pressure is desired in the chamber 12 for example, the valve 46 is closed. The valve 42 in the branch from the pipe 45 is also closed. Thereupon, the steam created by the cooking in the chamber 12 will build up an internal pressure above atmosphere, and the contents of the chamber 12 will then be subjected to what is commonly known as pressure cooking. At the start, live steam may be admitted directly to chamber 12 thru a pipe 12a, to build up the cooking pressure and temperature quickly. Similarly, pressure may be created in the chamber 11 by closing the valves 40 and 42 of the pipe 38, and live steam may be admitted to this chamber thru pipe 11a for starting the cooking.

When it is desired to restore the internal pressure in either chamber to atmosphere, such as when the material is to be passed from one chamber to another, the valves 40 or 46 in the pipes 38 and 45 are closed depending upon which chamber is to be vented, and thereupon the valve 42 in that pipe 38 or 45 leading to the chamber to be vented is opened to relieve the excess pressure. It will be understood that the charging cover 23 is normally sealed in position during a cooking operation, and is opened only when a new charge is to be placed in the top chamber 12.

Figure 4:
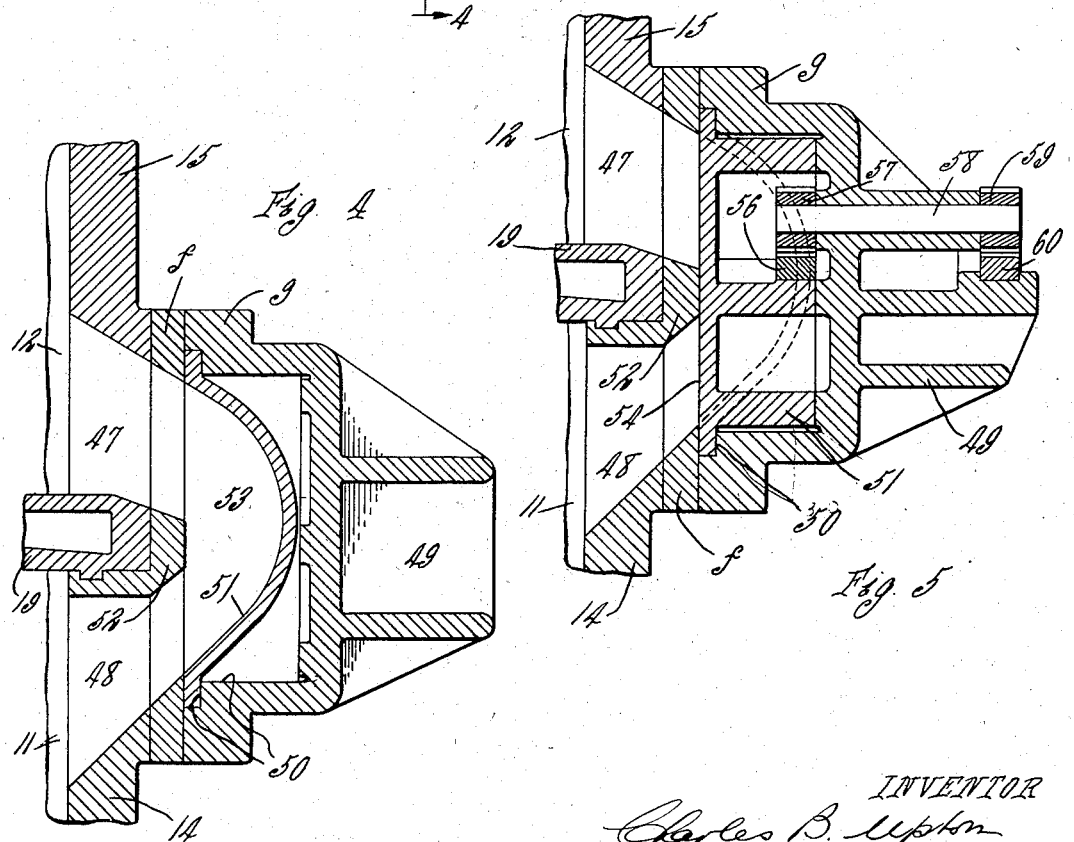
Fig. 4 is a sectional elevation of the same, the section being taken approximately along the line 4—4 of Fig. 3.
Figure 5:
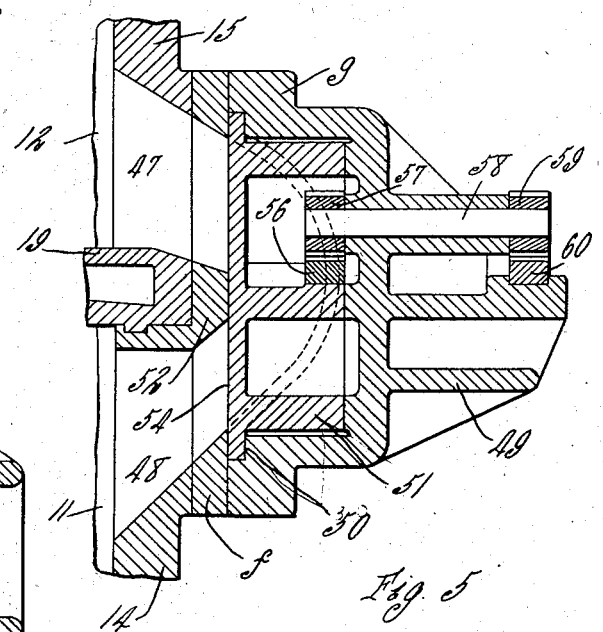
Fig. 5 is a sectional elevation of the same with the section taken approximately along the line 4—a—b—c of Fig. 3.

The gate mechanism by which the charges or batches are passed from one chamber to another is not shown in Figs. 1 and 2 because it is at the rear of the parts shown in those figures, and in the illustrated example it is located at the edge of the partition wall between the chambers as shown in Figs. 3 to 5. The gate or valve mechanism shown in Figs. 3 to 5 is the gate which controls the passage of the materials being cooked from the chamber 12 to the chamber 11, but identically the same mechanism is used for controlling the passage of the products from the chamber 11 to the chamber 10, or between any other chambers if the number of chambers is increased. Such gate or valve mechanism is also utilized between the chambers 12 and 10 in Fig. 2.

Referring now particularly to Figs. 3 to 5, the sections 14 and 15 are provided adjacent the edge of the bottom 19 with apertures or ports 47 and 48. A gate frame 49 is secured to the sections 14 and 15 so as to cover the ports 47 and 48. The gate frame 49 may be formed in two sections $f$ and $g$, which abut face to face and have between them a slot 50 in which slides a gate member 51. The gate member 51 slides from side to side and its inner face cooperates with the flat face of a wear plate 52 which is disposed along the exposed edge of the bottom wall or section 19. The gate member 51 is provided at one point in its length with a passage or recess 53 which connects the ports 47 and 48 when the gate member is in one position such as shown in Figs. 3 and 4. This is the open position of the gate member, and the products or material being cooked or treated in the chamber 12 may pass downwardly into the next lower chamber 11, in the case of Fig. 1, or into the holding chamber 10 in the case of Fig. 2. The agitator arms 33a which sweep the floor of the upper compartment shift the material across the floor into the port 48, from which it flows by gravity through the recess 53 of the gate member to and through port 47 into the next lower chamber.

When the gate is to be closed, the sliding gate member 51 is shifted sidewise, that is, endwise of itself, so as to carry its non-recessed face 54 across the ports 47 and 48. During this movement of the sliding gate member, which is from the right to the left in Fig. 3, the gate member will engage against the wedge or cam surface 55 (Fig. 3) of the gate frame which wedges the gate member tightly against the faces through which the ports 47 and 48 open, thus tightly sealing the chambers 11 and 12. Each gate member is provided with a horizontally extending gear rack 56, and a pinion 57, which meshes with this rack, is fixed upon a shaft 58 that is rotatably mounted in the gate frame 49. The other end of the shaft 58 provided with a handle if manual operation of the valve or gate is intended or desired, but in case of automatic operation, as illustrated, the handle is replaced with a pinion 59 which meshes with a rack bar 60 that is mounted to slide endwise of itself upon the gate frame 49.

The core 61 of a solenoid or electro-magnet 62 (Fig. 3) is connected pivotally by a pin 63 to one end of the rack bar 60, so as to pull the rack bar 60 in one direction when that solenoid is energized, and the core 64 of another electro-magnet or solenoid 65 is pivotally connected by pin 66 to the opposite end of the rack bar 60, so as to pull the latter endwise in the opposite direction. The sliding gate valve or member 51 may, therefore, be shifted from open to closed position and vice versa merely by energizing the electromagnets or solenoids 64 and 65 alternately.

Figure 6:
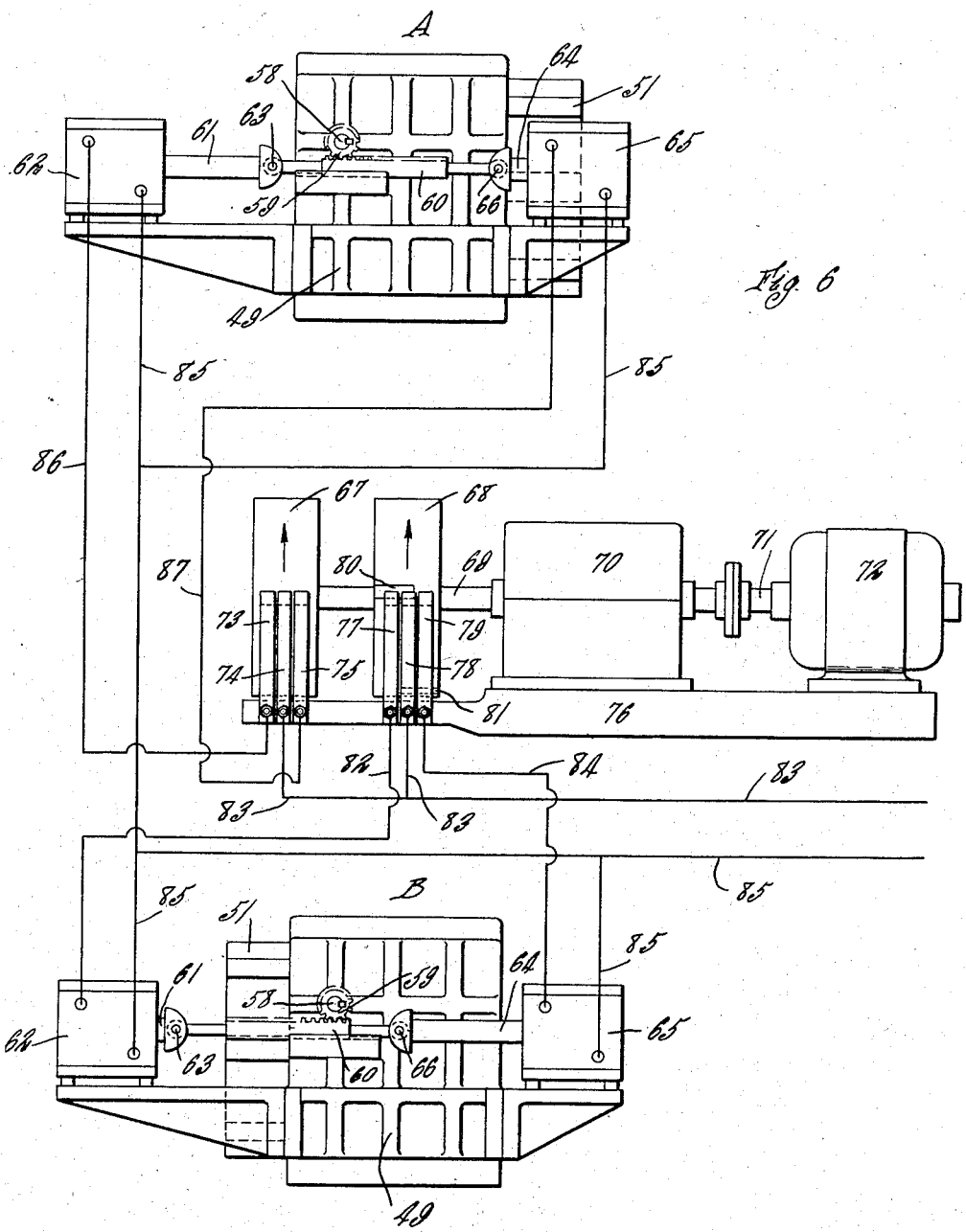
Fig. 6 is a diagram of the mechanism for operating the gates between the cooking compartments automatically.

Referring now particularly to Fig. 6, the automatic means for operating the different gates or valves in a desired order or sequence, automatically will be described. The upper gate valve will be designated generally by the reference A and the lower valve or gate member which controls the passage between the chambers 10 and 11 will be designated generally by the reference character B. A pair of cylinders 67 and 68 are mounted on a shaft 69, and this shaft is driven through a suitable speed reducing device 70 from the shaft 71 of a motor 72. The cylinders 67 and 68 are thus rotated slowly and in the same direction, as shown by the arrows in Fig. 6.

Three fingers 73, 74, and 75 are arranged side by side, are insulated from one another, are mounted upon the base 76 of the speed changer 70, and bear at their free ends upon the periphery of the drum or cylinder 67. Three additional fingers 77, 78, and 79 are similarly mounted and bear upon the periphery of the cylinder 68. The drum 68 carries upon its periphery a pair of conducting bars 80 and 81 spaced apart in a direction peripherally of the cylinder. The bar 80 extends endwise of the cylinder from one end a distance such that it connects two of the fingers, 77 and 78, when it passes beneath those fingers in its rotation with the cylinder, and the bar 68 extends in a direction endwise of the cylinder from the other end for a distance such that it connects only the fingers 78 and 79 when it passes beneath the free ends of those fingers, during the rotation of the drum.

From the foregoing it will be seen that during the rotation of the cylinder 68, the conducting bar 80 will connect the fingers 77 and 78 for a short interval, and a short time later the conducting bar 81 will pass beneath the bearing ends of the fingers and connect the fingers 78 and 79. The fingers 73, 74, and 75 are similarly connected at intervals by similar contact bars mounted in the surface of the drum or cylinder 67 but not visible in Fig. 6.

The finger 77 is connected by wire 82 to the solenoid 62 of the gate device B. The finger 78 is connected to a common circuit wire 83 of an electric circuit which supplies the operating power. The finger 79 is connected by wire 84 with the solenoid 65 of the gate device B. The other terminals of the solenoids 62 and 65 of the gate device B are connected to the other main circuit wire 85. Similarly the finger 73 is connected by a wire 86 to the opening solenoid 62 of gate device A, finger 74 is connected to the common circuit wire 83 and the finger 75 is connected by a wire 87 to the closing solenoid 65 of the gate device A. Both solenoids of the gate device A are also connected to the main circuit wire 85. The drum or cylinder 67 is so positioned angularly upon the shaft 69 with respect to the other drum 68, that the lower gate device will be kept open a short interval of time sufficient to equal a complete discharge into holding chamber 10 of a batch of material being cooked in the lower cooking chamber 11, and is then closed before the upper gate device A is opened. The gate device A is similarly opened for a length of time sufficient to effect a discharge of the contents of the chamber 12 into the chamber 11, and is then closed. This arrangement prevents any danger of both gate devices being opened at the same time. The contact bars or strips 80 and 81 in the surfaces of the drums are of course insulated from the drum and from each other, and preferably the drums are both provided with peripheral bands of insulating material into which the contact bars are set.

In the use of this improved cooker, and considering Figs. 1, and 3 to 6, let it be assumed that the parts are assembled as shown. The first batch or charge of material to be cooked is supplied to chamber 12 through the opening 22, and the cover 23 then is locked in tightly closed position. Steam is then admitted to the sides and bottoms of all the chambers, and also through pipe 12a directly into chamber 12 until the cooking temperature and pressure are reached and the agitator shaft 30 is rotated so as to thoroughly agitate the material and insure uniform heating thereof. Assuming that the first treatment desired is to cook the material under pressure, valve 46 in the pipe 45 is closed. The moisture of the material which is converted into steam can not escape, and consequently the pressure within the chamber 12 soon increases above atmospheric whether or not live steam is admitted directly to the chamber at the start. This internal pressure will be shown in the gauge in the pipe 45 and if the pressure exceeds a safe maximum, the safety valve 44 will open and allow the escape of the excess steam until the pressure falls to a safe pressure. After a desired interval of time which is determined by the rate at which the drums 67 and 68 are driven, the gate device A will be opened by the electrical circuits shown in Fig. 6, allowing the material or batch to pass into the second cooking chamber 11. A new batch is then supplied to chamber 12.

Assuming that it is desired to further cook the batch in chamber 11 under a partial vacuum, the valve 40 in pipe 38 is opened and the valve 42 in that pipe closed. This connects the chamber 11 to the exhauster 39 which creates and maintains a partial vacuum in chamber 11. The batch in this chamber is agitated and heated in the same manner as it was in chamber 12, and the degree of vacuum is shown by the gauge 43. After a desired interval of time, determined by the position of the drum 68 on the shaft 69 and its rate of rotation, the lower gate device B is opened and the batch from chamber 11 discharged into the holding chamber 10. The lower gate device B is closed just before the upper gate device A is opened to deliver a new batch into the chamber 11. The material when introduced into the upper chamber 12, is subjected at first to cooking under pressure, then delivered to chamber 11 and subjected to cooking under a partial vacuum, and then delivered into the holding chamber 10, all automatically.

In the chamber 10 the material is agitated continuously and kept hot by the jacketed wall and bottom, and withdrawn in fractional batches by simple manipulation of the valve 28. The process, therefore, in Fig. 1 is really a continuous one, and the treatment in the different chambers may be different and may be varied widely. If it is desired to cook under pressure in both chambers, the valves in both pipes 38 and 45 are shut off from the exhauster and the internal pressure will be built up in each chamber. Live steam may be also admitted to chamber 11 through pipe 11a, for quickly building up the internal pressure. Of course, each chamber may be vented, at any time, if desired, by opening the valve 42 in the pipe leading to that chamber. For example, in the top chamber 12 it may be desired to vent the chamber to the atmosphere before the cover 25 is opened.

A pipe 88 is provided with valve controlled branches leading to the bottom of each of the chambers 11 and 12, so that samples may be withdrawn for testing at any time or the free oil may be withdrawn prior to the discharge of each batch of material into the next lower chamber.

Referring now to Fig. 2, the middle chamber 11 of Fig. 1 is omitted, and the batches of material are discharged directly from the cooking chamber 12 into the holding chamber 10. The pipe 45 is connected to the exhauster as in Fig. 1, with the same controlling valves, so that the batch of material in the chamber 12 may be subjected to either pressure or vacuum while being cooked, or first to one and then to the other by suitable manipulation of the valves in the pipe 45.

It will be obvious that various changes in the details, which have been herein described and illustrated in order to explain the nature of the invention, may be made by those skilled in the art within the principle and scope of the invention as expressed in the appended claims.

1. In a cooker, an upright structure having three chambers arranged at different successive levels with a passage connecting each of the two upper chambers with the top of the next lower chamber, the upper two chambers being air tight, the uppermost chamber having an airtight removable closure which may be opened for charging that chamber, and the lowermost chamber having a discharge passage from its bottom part, a gate for each of said passages, an agitator in each of said upper two chambers, each of said chambers having a steam jacket for heating it, means for admitting live steam to the interior of the uppermost chamber, a pressure relief vent for the uppermost chamber, and having a valve which may be operated to close said vent, whereby steam pressure may be built up in said uppermost chamber when the vent is closed, and a suction device connected to the intermediate chamber for creating a partial vacuum therein, whereby material to be cooked may be deposited in the uppermost chamber, and there agitated and cooked under live steam and under pressure above atmosphere, then discharged into the intermediate chamber and there cooked and agitated under a partial vacuum to remove excess moisture, then discharged into the lowermost compartment where it is agitated and held at a uniform temperature, and then discharged as needed.

2. An improved cooker comprising an upright tubular structure subdivided by an approximately horizontal partition into a plurality of superposed chambers in each of which material may be treated under different conditions, said structure having apertures in the side wall thereof immediately above and below said partition and forming communication between said chambers with the aperture above the partition rising from said partition, a gate member disposed across both of said apertures and movable on said structure to present different portions thereof across said apertures, means engageable by one of said portions for tightly sealing and preventing communication between said apertures and said chambers during the treating of said material in said chambers, and the other of said portions having a channel therein which connects said apertures so as to provide a gravity chute leading from the uppermost aperture to the other, and an agitator in the chamber above said partition and moving in close proximity to the upper face of that partition for pushing the contents of the upper chamber towards the aperture from that chamber, so as to discharge said contents into the lower chamber when said gate member is moved to connect said apertures and said chambers.

3. An improved cooker comprising an upright tubular structure, subdivided by an approximately horizontal partition into two superposed airtight chambers in each of which material may be received and treated under different conditions, the side wall of said structure having an opening extending upwardly somewhat from said partition, with the bottom wall of the opening inclined outwardly and downwardly somewhat, the side wall of said structure also having another opening below said partition and in proximity to the first mentioned opening, the bottom wall of the second opening being inclined downwardly and inwardly from the outer face of said structure, and a gate member secured to said structure so as to bridge said openings and tightly close the same and prevent communication between said chambers, and said gate being mounted on said structure for movement between two positions in which it presents different portions across the openings, one of said portions being engageable with a part of said structure and preventing communication between said openings and said chambers when placed thereacross, and the other of said portions having a channel therein connecting said openings and said chambers when brought into a position thereacross, said other portion being formed to provide a gravity chute between said openings and conduct the contents of the upper of said chambers to the lower chamber by gravity.

4. An improved cooker comprising an upright tubular structure, subdivided by an approximately horizontal partition into two superposed airtight chambers for the reception of batches of material, means for treating the material in one of said chambers to cooking under pressure, means for simultaneously treating the material in the other chamber to cooking under a substantial vacuum, the side wall of said structure having an opening communicating with one of said chambers and extending upwardly somewhat from said partition, with the bottom wall of the opening inclined outwardly and downwardly somewhat, the side wall of said structure also having another opening below said partition and in proximity to the first mentioned opening and in communication with said other chamber, the bottom wall of the second opening being inclined downwardly and inwardly from the outer face of said structure, a gate member secured to said structure so as to bridge said openings and tightly close the same, and mounted on said structure for movement between two positions in which it presents different portions across the openings, one of said portions sealing said opening and preventing communication between said chambers when placed thereacross, and the other of said portions having a channel therein connecting said openings when brought into a position thereacross, said other portion being formed to provide a gravity chute between said openings and chambers and conduct the contents of the upper of said chambers to the lower chamber by gravity, and an agitator moving in the upper chamber in close proximity to said partition and formed to push outwardly, during its movement, the contents of said upper chamber for discharge into the lower chamber through the channel in said gate member, when the gate member is in a position to connect said openings by said chute.

5. In a cooker, an upright structure subdivided into three superposed chambers, with gate controlled passages connecting the lower part of each of the upper chambers with the next lower chamber, the upper two chambers being air tight, the uppermost chamber having an air tight, removable closure which may be opened for charging that chamber, and the lowermost chamber having a discharge passage from its bottom part, an agitator in each of said upper two chambers, means for admitting live steam to the interior of the uppermost chamber, a pressure relief vent for said uppermost chamber having a valve which may be operated to close said vent, whereby steam pressure may be built up in said uppermost chamber when the vent is closed, a suction creating device connected to the intermediate chamber for creating a partial but material vacuum therein, and means for heating the contents of each of said chambers, whereby the material to be cooked may be disposed in the uppermost chamber and agitated and cooked under pressure above atmosphere, then further cooked and agitated in the intermediate chamber to remove excess moisture, and then held in the lowermost chamber at a uniform temperature throughout its mass until withdrawn for pressing.

CHARLES B. UPTON.